(12) United States Patent
Takagi

(10) Patent No.: US 6,917,173 B2
(45) Date of Patent: Jul. 12, 2005

(54) AUTOMOBILE WIPER DRIVING APPARATUS

(75) Inventor: Nobutomo Takagi, Okazaki (JP)

(73) Assignee: Denso Corporation, Kariya (JP)

(*) Notice: Subject to any disclaimer, the term of this patent is extended or adjusted under 35 U.S.C. 154(b) by 13 days.

(21) Appl. No.: 10/654,963

(22) Filed: Sep. 5, 2003

(65) Prior Publication Data

US 2004/0056620 A1 Mar. 25, 2004

(30) Foreign Application Priority Data

Sep. 24, 2002 (JP) ........................................ 2002-277712

(51) Int. Cl.[7] ................................................ H02P 1/04
(52) U.S. Cl. ........................ 318/444; 318/443; 318/280
(58) Field of Search ................................. 318/443, 444, 318/DIG. 2, 280, 599, 283, 445, 449, 452, 485, 484, 487; 15/250 C; 388/804

(56) References Cited

U.S. PATENT DOCUMENTS 4,663,575 A    5/1987  Juzwik et al.
4,733,142 A  *  3/1988  Bicknell ...................... 318/283
5,254,916 A  * 10/1993  Hopkins ...................... 318/443
2001/0041956 A1 * 11/2001  Wong et al. .................. 701/36

FOREIGN PATENT DOCUMENTS

JP        2001-95286      4/2001
JP        2001-315620    11/2001
JP        2002-37035      2/2002

* cited by examiner

Primary Examiner—Karen Masih
(74) Attorney, Agent, or Firm—Posz Law Group, PLC

(57) ABSTRACT

The wiper driving apparatus module includes: a motor 12 for driving a wiper unit; a wiper ECU 11 for driving the motor 12; a deceleration mechanism (including gears). The two brush DC motor is employed and driven by a pulse width modulation (PWM) signal, in place of the conventional three brush motor wherein brushes are changed in accordance with a wiper operation speed. Therefore, the number of windings is only a number required for a high speed operation of the wiper unit. The high speed operation is implemented by 100% duty PWM signal, while the low speed operation is implemented by reducing the duty. The PWM signal duty is changed in response to a rainfall, windshield surface state and wind pressure which cause the wiping speed fluctuation.

10 Claims, 10 Drawing Sheets

FIG. 5A

| OPERATION MODE | ROTATION SPEED |
|---|---|
| HIGH SPEED | 50—65 CYCLES/MIN |
| LOW SPEED | 20—35 CYCLES/MIN |

FIG. 5B

| REF "A" | | 35 CYCLES/MIN |
|---|---|---|
| REFR "B" | LOW TORQUE | 25 CYCLES/MIN |
| | HIGH TORQUE | 20 CYCLES/MIN |
| REF "C" | | 10 CYCLES/MIN |

AUTOMOBILE WIPER DRIVING APPARATUS

BACKGROUND OF THE INVENTION

1. Field of the Invention

The present invention relates to an automobile wiper driving apparatus for driving a wiper on a windshield of an automobile vehicle.

2. Description of the Related Art

A conventional wiper driving apparatus 100 as shown in FIG. 10 comprises: a motor 101 for driving a not-shown wiper unit; a wiper electronic control unit (ECU) 102 (provided separately from the motor 101) for driving the motor 101; a combination switch (COMBI-SW) 103 for selecting a low & high speed modes and intermittent mode; and another switch (HIGH-SW 14h) 103a which is turned on when the high (HIGH) speed mode is selected by the COMBI-SW 103.

Further, the coils of the motor 101 are in contact with three brushes: a HIGH brush 101a connected with a contact of a relay 105a for switching on the HIGH speed mode; a LOW brush 101b connected through a contact 109a of a relay 109 with a MOSFET (n-channel power MOSFET) 106 for switching on the LOW speed mode; and a common brush 101c connected with the ground.

Thus, the conventional wiper driving apparatus as disclosed in JP2002-37035A causes the wiper speed differences by utilizing differences of a winding number between the HIGH brush 101a (& the common brush 101c) and winding number of LOW brush 101b (& common brush 101c).

Further, a not-shown circuit including relays and capacitors for the intermittent mode is provided for driving the LOW brush 101b and common brush 101c of the wiper motor 101 at a prescribed time interval.

The wiper ECU 102 comprises: a bipolar transistor 104 and relay 105 both for the HIGH speed mode; a MOSFET 106 for the LOW speed mode; a charge pump 106a for switching on the MOSFET 106; a MOSFET 107 for braking and stopping the motor 101, when a park position detection switch detects that the wiper reaches a prescribed stopping position (park position); a transistor 108 and relay 109 both for causing the LOW brush 101b to be electrically open; a micro-computer 110 for activating the relays 105 and 109 and for controlling gate voltages of the MOSFETs 106 and 107.

The contacts 105a and 109a as shown in FIG. 10 indicates that the relays 105 and 109 are not switched on.

Next, the operation of the wiper driving apparatus 100 is explained.

When the driver selects LOW speed mode by operating the COMBI-SW 103, the MOSFET 106 is switched on by the micro-computer 110. At this time, the contacts 105a and 109a are positioned as shown in FIG. 10. Accordingly, a voltage from a voltage source is applied through the MOSFET 106 and contact 109a to the LOW brush 101b, thereby operating the wiper under the LOW speed mode.

On the other hand, when the driver selects HIGH speed mode by operating the COMBI-SW 103, the transistor 104 is switched on by the micro-computer 110, thereby actuating the relay 105 and switching the position of the contacts 105a to the left (ON) position in FIG. 10. Accordingly, the voltage from the voltage source is applied through the contact 105a to the HIGH brush 101a, thereby operating the wiper under the HIGH speed mode.

Under the HIGH speed mode, a voltage higher than the voltage (from the voltage source) applied to the HIGH brush 101a is induced in the LOW brush 101b. However, if the contacts 109a happens to remain at the right (OFF) position in FIG. 10 even after switching on the HIGH speed mode, the HIGH brush 101a and LOW brush 101b are short-circuited with each other by a parasitic diode formed in the MOSFET 106. Accordingly, an electric current is caused to flow by the induced high voltage along a direction as shown by an arrow "X".

Therefore, the conventional wiper driving circuit as shown in FIG. 10 employs the HIGH-SW 103a which is turned on when the transistor 108 is switched on by the micro-computer 110. Thus, when the HIGH speed mode is selected, the contact 109a is switched from the right (OFF) position to the left (ON) position by the activated relay 109, whereby the LOW brush 101b become electrically open.

Recently, it has been of concern to unite the motor 101 and ECU 110 into a body, like modules of other automobile parts.

However, the conventional motor 101 has a disadvantage that it becomes large-scaled, because three brushes are required and moreover a total number of coil windings is increased to some degree in order that the wiper speed difference is achieved by a winding number difference. Further, it has another disadvantage that a part of the windings becomes of no use under the HIGH speed mode, because The HIGH speed mode requires less windings than the LOW speed mode does.

Further, the conventional motor 101 has a still another disadvantage that such driving devices as transistor 104 & relay 105 and the MOSFET 106 & charge pump 106a are required for the HIGH and LOW speed mode, respectively and independently. Further, it has other disadvantage that the transistor 108 & relay 109 is required for electrically opening the LOW brush 101b when the HIGH speed mode is turned on. Thus, the ECU 102 becomes complicated and large-scaled.

Accordingly, the large-scaled motor 101 with the large-scaled ECU 102 merely results in a larger-scaled module which can not easily mounted in a limited automobile space.

SUMMARY OF THE INVENTION

An object of the present invention is to make a motor for driving a wiper unit as well as motor driving means small-sized, thereby assembling them in a small-sized module.

The present invention has seven features as stated below.

Feature 1 resides in that a two brush DC motor is employed and is driven by a pulse width modulation (PWM) signal, in place of the conventional three brush motor wherein brushes are changed in accordance with a wiper speed.

Therefore, the number of windings is only a number required for a high speed operation of the wiper unit. The high speed operation is implemented by 100% duty PWM signal, while the low speed operation is implemented by reducing the duty of the PWM signal.

According to Feature 1, the brush number as well as the coil winding number is reduced, thereby making the motor small-sized.

Feature 1 resides also in that the wiper driving means can be made simplified and small-sized, because one (or at least one) switching element suffices to generate different operation speeds, although the conventional wiper driving means employs such switching elements as an individual relay every operation speed.

Therefore, a small wiper module including a small motor and small wiper driving means can be manufactured.

Further, diversified speed controls including the intermittent operation are possible, because an arbitrary operation speed can be implemented by setting up an arbitrary duty of the PWM signal. Particularly, a non-operating period in the intermittent operation can be easily implemented merely by setting up the duty to be zero.

Further, the switching element, e.g., MOSFET, can be provided at a high side of the motor (on a current route between the anode of the DC power supply and motor) as well as at a low side of the motor (on a current route between the motor and the cathode of the DC power supply).

In general, the high side switching element is a p-channel MOSFET. However, the p-channel MOSFET become larger than an n-channel MOSFET due to the carrier difference or the carrier mobility difference, in order to obtain the same driving capability.

On the other hand, the high side n-channel MOSFET could be employed together with a charge pump for applying a high voltage to the gate of the n-channel MOSFET. However, this is not advantageous.

Therefore, Feature 2 of the present invention is that the switching element is a low side power MOSFET (particularly n-channel MOSFET). Thus, the charge pump circuit is not required and the switching element (n-channel power MOSFET) becomes smaller, compared with the p-channel power MOSFET. Accordingly, the wiper driving means in the wiper driving module can be made smaller and can be manufactured cheaply, compared with the conventional one.

Feature 3 is that the PWM signal duty is compensated in such a manner that the motor rotation speed follows an externally fixed operation speed, even when the load on the motor is changed. In general, the actual wiper speed does not become the externally fixed operation speed, due to various factors, e.g., a windshield surface condition, even when the PWM signal duty is set up to be a prescribed duty. For example, the actual wiper speed becomes decreased, when the windshield becomes dirty together with mud and rainfall, thereby increasing the wiper load. On the other hand, the actual wiper speed becomes increased, when the windshield is clean and only rain is to be wiped.

Here, the wiper speed is not only detected directly by the motor rotation, but also detected by the actual moving speed of the wiper unit. Alternatively, the operation speed of a wiper link mechanism may be measured or other possible method may be employed. The measured speeds are equally expressed as motor rotation speeds regardless of the measuring methods.

According to Feature 3, the wiper unit can be operated at an almost constant speed which is externally fixed, even when the motor load is changed.

Feature 4 is that the PWM signal duty is compensated on the basis of the motor current, in place of the above mentioned motor rotation as described in Feature 3.

It is well known that the motor torque is proportional to the motor current and the torque is inversely proportional to the rotation speed. For example, the motor current is increased, when the rotation speed is decreased, as the motor load is increased. On the contrary, the motor current is decreased, when the rotation speed is increased as the motor load is decreased. Thus, the motor rotation speed can be detected by the motor current.

According to Feature 4, similarly to Feature 3, the wiper unit can be operated at almost constant speed, even when the motor load is changed.

Feature 5 is that the wiper driving means sets up the PWM signal in such a manner that a duty during the wiper's moving from the maximum wiping position (upper end position) to the park position (lower end position) is greater than a duty during the wiper's moving from the park position to the maximum wiping position.

There is other factor than the windshield surface condition which causes the actual wiper speed to be different from the externally fixed operation speed.

General passenger cars such as a sedan and coupe, except a bus and truck, have the front windshield tilted. Therefore, a wind pressure is applied along the direction opposite to the wiper unit during the wiper's descent (the wind pressure disturbs the wiper's descent.

According to Feature 5, the wiper unit can be moved at a constant speed by canceling an effect of the wind pressure.

However, the wiper descending speed may possibly be over-compensated, if the duty during the wiper descent is simply increased.

Therefore, Feature 6 is devised in order to overcome the above mentioned possible disadvantage of Feature 5.

The Feature 6 is that the automobile wiper driving means comprises: a timer for counting a wiper ascent time period T2 spent during the wiper's moving from the park position to the maximum wiping position; and another timer for counting a wiper descent time period T1 spent during the wiper's moving from the maximum wiping position to the park position. The wiper driving means sets up the duty of the PWM signal in such a manner that a difference (T1–T2) between the wiper descent time period Ti and wiper ascent period T2 is within a prescribed period.

Concretely, if the wiper ascent time period is shorter than the wiper descent time period, the PWM signal duty during the wiper ascent is decreased, or the duty during the wiper descent is increased. The prescribed period tolerance may be decided in such a manner that: the speed difference does not become visibly apparent; or the speed difference does not make the driver feel a sense of physical or mental disorder.

According to Feature 6, the descending and ascending speed of the wiper unit can be surely made within a prescribed tolerance range.

Feature 7 is that the wiper driving means comprises a relay connected in parallel with the switching element, wherein the DC motor is rotated, regardless of the operation state of the switching element, by switching on the relay, at a prescribed speed prescribed by the externally fixed operation speed.

Thus, when the relay is switched on, the operation state is almost the same as if the switching element is always switched on (driven by 100% duty PWM signal).

The timing when the relay is switched on is decided in such a manner that, for example, the high speed mode is selected.

According to feature 7, the wiper unit can be surely moved, even when: the switching element malfunctioned; or the PWM signal for driving the switching element can not be generated.

Further, according to Feature 7, the motor rotation speed is arbitrarily decided. The connection of the relay in parallel with the switching element can rotate the motor at the highest possible speed, while the series connection of the relay and resistance in parallel with the switching element can rotate the motor at a lower speed.

According to the wiper driving module of the present invention including the motor and wiper driving means as characterized in Features 1 to 7, it becomes unnecessary to design spaces for individual parts, unnecessary to install and connect them, thereby reducing installing process steps and connecting wires.

BRIEF EXPLANATION OF THE DRAWINGS

FIG. 5A is a table of exemplary wiping rotation speeds at the HIGH and LOW speed mode, while FIG. 5B is a table of exemplary references for observing the wiping rotation speed, referred to at S120 and the following steps as shown in FIG. 4.

PREFERRED EMBODIMENT OF THE INVENTION

Embodiment 1

Figure 1:
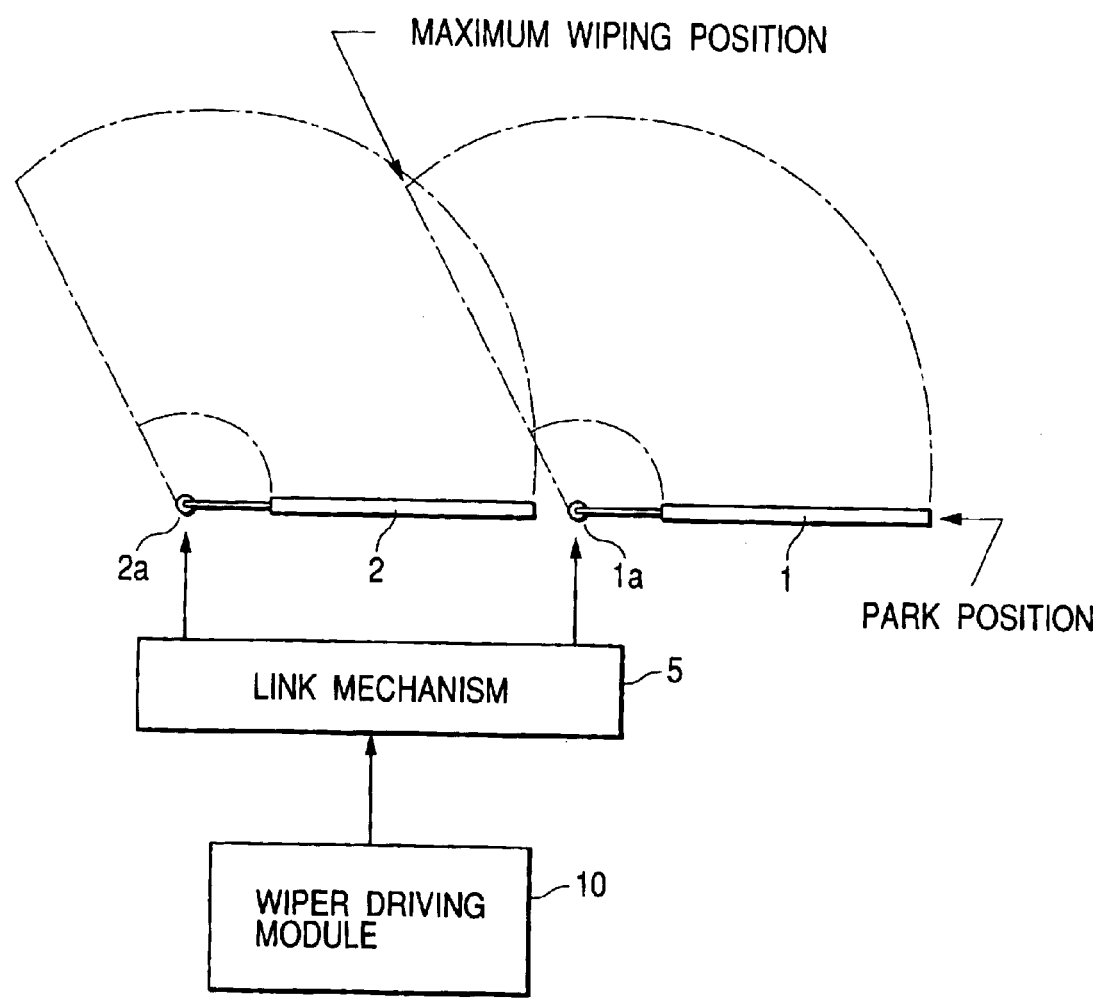
FIG. 1 is a general conceptual illustration of the wiper driving apparatus of the present invention.

FIG. 1 is a conceptual view of the wiper driving apparatus of Embodiment 1 of the present invention.

The wiper driving apparatus as shown in FIG. 1 is mounted on an automobile vehicle and used for wiping the outer surface of the front windshield. The wiper driving apparatus as shown in FIG. 1 comprises: a pair of wipers 1 and 2 for wiping the outer surface of the front windshield; a wiper driving module 10 for driving the wipers 1 and 2; and a link mechanism 5 for transmitting to the pair of wipers 1 and 2 a driving force of the wiper driving module 10.

In the wiper driving apparatus of Embodiment 1, like conventional wiper apparatuses, the HIGH speed mode or LOW speed mode can be set up by driver's operating the COMBI-SW 14a (cf. FIG. 3) near the driver's seat. The intermittent mode operating under LOW speed mode can be also set up by the COMBI-SW 14a. Further, there can be provided an automatic mode wherein the wipers 1 and 2 is automatically driven in response to a rainfall onto the windshield.

The wiper driving module 10 supplied with an electric power by a vehicle mounted battery controls a rotation of motor 12 (cf. FIG. 2) in response to the mode selected by the driver.

The wipers 1 and 2 are of the well known type which are operated by the rotational force of the wiper driving module 10 transmitted through the link mechanism 5. The wipers 1 and 2 usually rest at the lower end position (park position), while they are operated and are swept from the lower end position to the upper end position (maximum wiping position) around the rotation axes 1a and 2a, respectively, thereby sweeping their wiping areas as shown in FIG. 1.

Although the wiper driving module 10 rotates the motor 12 (cf. FIGS. 2 and 3) along a prescribed direction, the wipers 1 and 2 are moved both ways. The lower end position is the park position (a position at which the wipers 1 and 2 stop) and the upper end position is a maximum wiping position.

Figure 2:
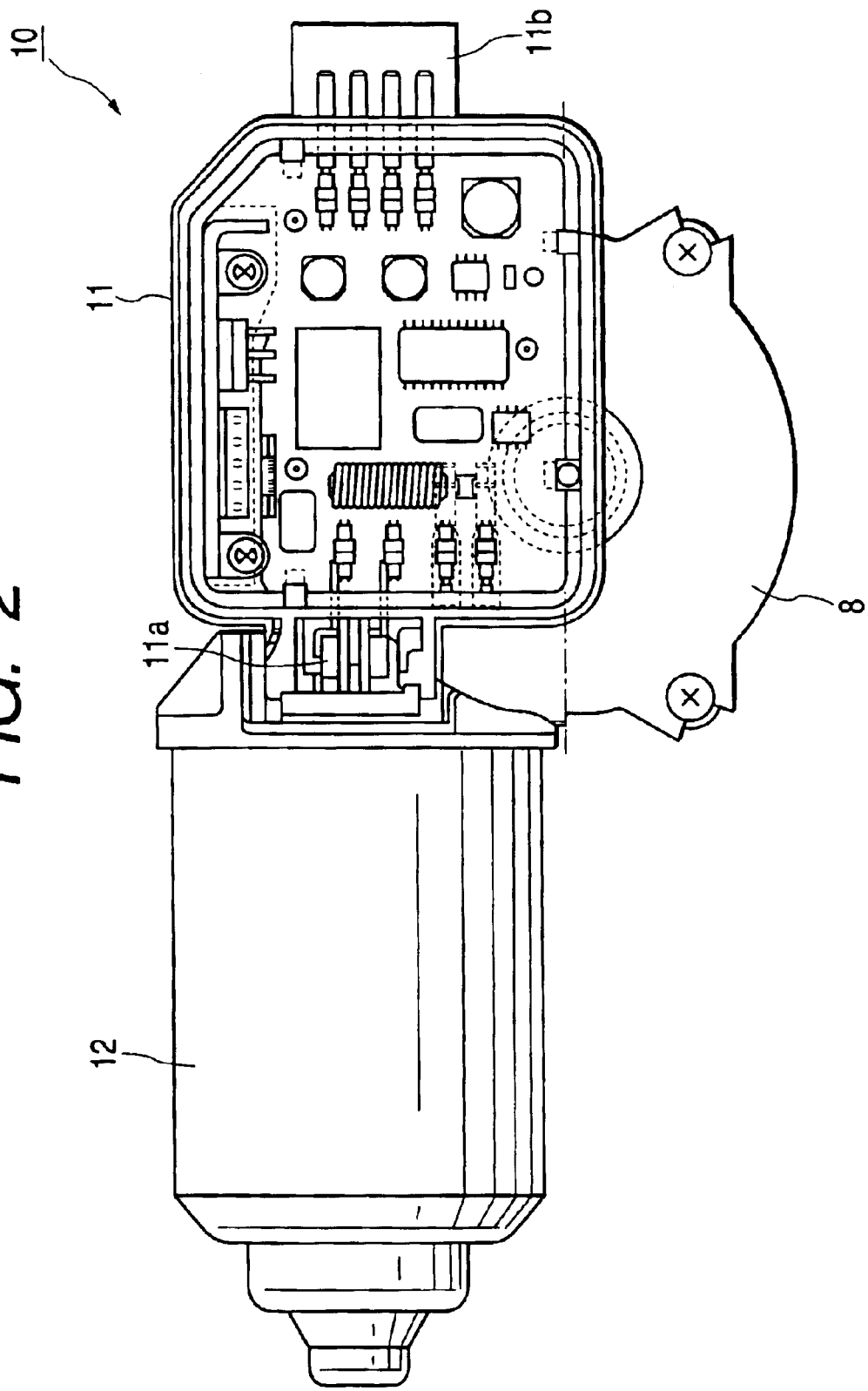
FIG. 2 is a partially cut-away side view of the wiper driving apparatus module of the present invention including the motor and wiper driving means.

FIG. 2 is a partially cut-away side view of a wiper driving module 10 which comprises: a motor 12; a wiper ECU (driving means) 11 for driving the motor 12; a deceleration mechanism (including gears) 8.

The wiper ECU 11 is electrically connected by terminals 11a with motor 12, while it is electrically connected by connectors 11b with external devices.

Figure 3:
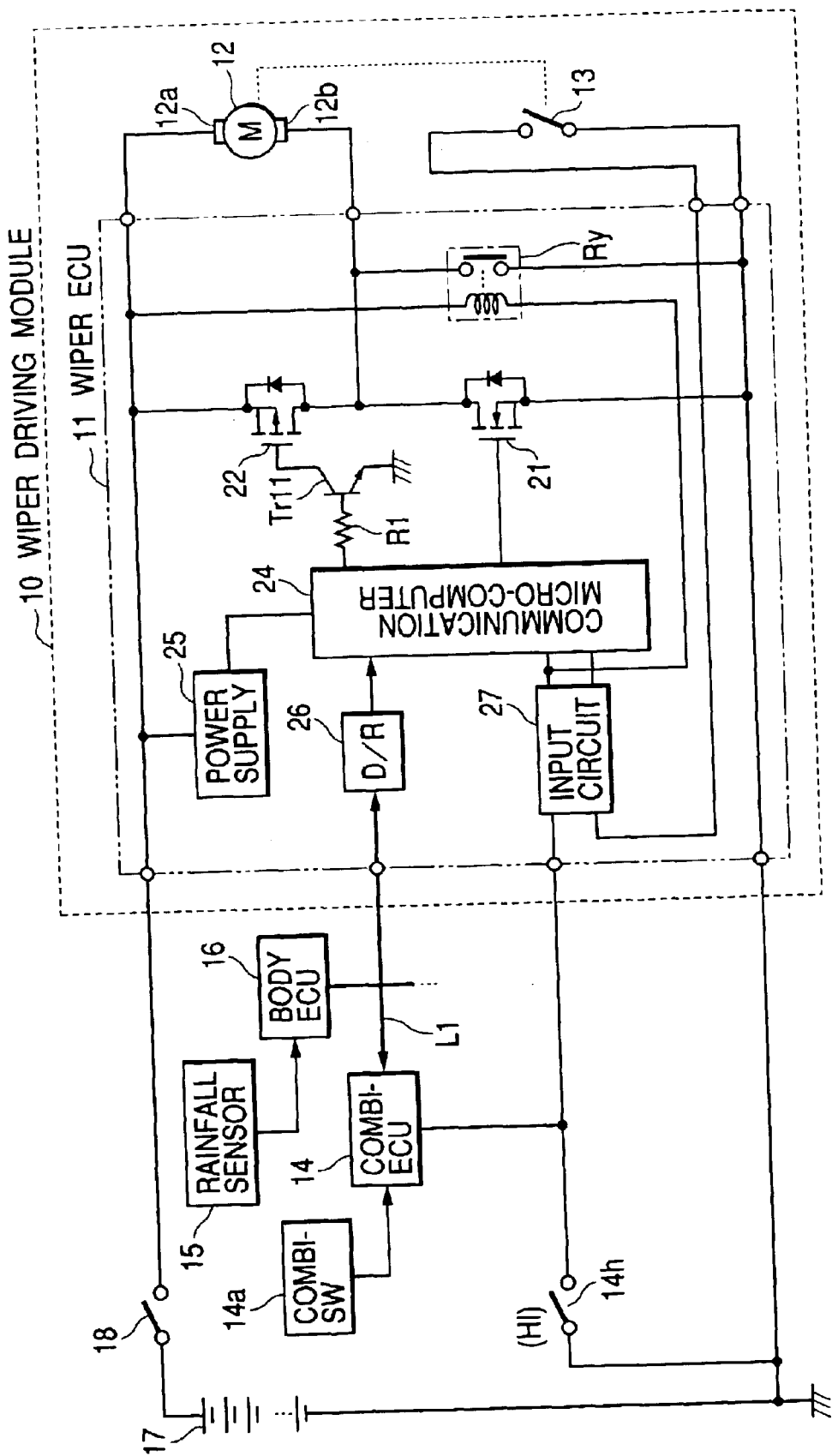
FIG. 3 is a circuit diagram of the wiper driving apparatus of Embodiment 1 of the present invention.

FIG. 3 is a circuit diagram of the wiper driving apparatus of Embodiment 1 including the wiper driving module comprising the wiper ECU 11 and motor 12.

The wiper driving apparatus as shown in FIG. 3 controls the wipers 1 and 2 in response to the operation mode selected by the COMBI-SW 14a. The wiper driving apparatus as shown in FIG. 3 comprises: a wiper driving module 10; a COMBI-ECU 14 for outputting to a wiper ECU 11 (in the wiper driving module 10) a signal corresponding to the selected operation mode set up by the COMBI-SW 14a; a rainfall sensor 15 for detecting a rainfall; a body ECU 16 for outputting to the wiper ECU 11 a rainfall signal (indicating the rainfall) on the basis of the output from the rainfall sensor 15; a HIGH-SW 14h (which is turned on when the HIGH speed mode is selected) for compulsorily driving the wipers 1 and 2; a battery 17 of a DC power supply for supplying various devices mounted on the automotive vehicle with an electric power; and an ignition switch 18 for turning on and off the power supply route between the battery 17 and the vehicle mounted devices.

The COMBI-ECU 14, body ECU 16 and wiper ECU 11 are electrically connected with each other through a multiple communication line L1, thereby transmitting the operation mode signal from the COMBI-ECU 14 to the wiper ECU 11 and transmitting the rainfall signal from the body ECU 16 to the wiper ECU 11.

The COMBI-ECU 14 outputs not only the operation mode signal, but also controls an ejection of a window washer solution and further controls turning on and off of such lights as lamps and direction indicators. Similarly, the body ECU 16 outputs not only the rainfall signal, but also controls body related devices other than the wipers.

The wiper driving module 10 comprises: the motor 12 which is a DC motor with a pair of brushes 12a and 12b; and the wiper ECU 11. Further, the park position detection switch 13 for detecting that the wipers 1 and 2 reached the park positions (the lower end positions) may be provided in the deceleration mechanism 8. The switch 13 is a rotatable sliding switch using a not-shown rotation plate which turns 360□ when the wipers 1 and 2 starts from and comes back to the lower end position. The switch 13 is switched on when the wipers are at the park position.

The wiper ECU 11 drives and controls the motor 12 on the basis of the operation mode of the COMBI-SW 14a and rainfall detected by the rainfall sensor 15. The wiper ECU 11 comprises: n-channel power MOSFET (a switching device) 21 at the low side of the motor 12 (the cathode side of the battery 17) on the power supply route from the battery 17 to the motor 12; a p-channel power MOSFET 22 for rapidly braking the rotation of the motor 12 when the wipers 1 and 2 are stopped; a communication micro-computer 24 which outputs a pulse width modulation (PWM) signal for driving the motor 12, switches on the MOSFET 22 when the wipers 1 and 2 are stopped and generally controls the motor 12; a power supply circuit 25 for converting a voltage of the battery 17 into a prescribed voltage (e.g., 5 V) in order to supply the wiper ECU 11 with an electric power; a driver (D/R) circuit 26 for receiving signals through the multiple communication line L1 from the COMBI-ECU 14 and body ECU 16 and for converting them into signals compatible with the communication micro-computer 24 and for outputting them to the communication micro-computer 24; an input circuit (interface) 27 for transmitting to the communication micro-computer 24 the states of the HIGH-SW 14*h* and park position detection switch 13; and a back-up relay Ry for compulsorily operating the motor 12, regardless of the state of the MOSFET 21, when the HIGH-SW14*h* is switched on, or, in other words, when the HIGH speed mode is set up at the COMBI-SW 14*a*.

The communication micro-computer 24 transmits and receives various multiple communication signals through the multiple communication line L1 to and from the ECU 14 and 16.

When the LOW speed mode is set up at the COMBI-SW 14*a*, the communication micro-computer 24 turns on and off the MOSFET 21 by the PWM signal with a duty for operating the wipers 1 and 2 under the LOW speed mode, as explained late in detail.

On the other hand, when the HIGH speed mode is set up at the COMBI-SW 14*a*, the communication micro-computer 24 switches always on (duty 100%) the MOSFET 21, thereby switching always on the motor 12 (operating the motor 12 under the HIGH speed mode).

Here, HIGH-SW 14*h* is also switched on when the HIGH speed mode is set up at the COMBI-SW 14*a*. Thus, the back-up relay Ry is switched on. Therefore, Ry maintains the HIGH speed operation of the motor 12, even when the MOSFET 21 can not be switched on due to malfunctions of the communication micro-computer 24 or multiple communication line L1.

The operation speed of the wipers 1 and 2 of the HIGH speed mode is a prescribed speed and its rotation speed is a prescribed rotation speed.

Further, when the intermittent mode is set up at the COMBI-SW 14*a*, the communication micro-computer 24 switches on and off the MOSFET 21 by the standard duty PWM signal for the LOW speed mode (as explained later), whereby the motor 12 is driven in such a manner that: the driving duty of the motor 12 is made 0% in order to stop the motor 12, when the park position detection switch 13 is switched on; and after a prescribed time period, the motor is driven again by the standard duty PWM signal.

Further, when the automatic mode is set up at the COMBI-SW 14*a*, the communication micro-computer 24 monitors the rainfall signal (the signal indicating a detection result by the rainfall sensor 15) from the body ECU 16 and switches on and off the MOSFET 21 by a PWM signal with a duty in response to the rainfall (e.g., the duty becomes great as the rainfall becomes increased). Thus, the motor 12 is rotated in response to the rainfall, thereby changing the wiping speed of the wipers 1 and 2.

Further, when the COMBI-SW 14*a* is turned off during operating the wipers 1 and 2, the communication micro-computer 24 switches on through the resistance R1 the transistor Tr 11, thereby switching on the MOSFET 22 in order to brake the motor 12.

The reason why the ECUs 11, 14 and 16 are connected with each other by the multiple communication line L1 is mainly resides in a wire-harness reduction. The wire-harness as a whole in an automobile can be reduced, not by a direct connection between the COMBI-SW 14*a* and wiper ECU 11, but by such a connection, e.g., that the COMB-ISW 14*a* is connected with the COMBI-ECU 14 (nearest to the COMBI-SW 14*a*) and moreover the multiple communication signal is transmitted and received to and from the COMBI-ECU 14.

Figure 4:
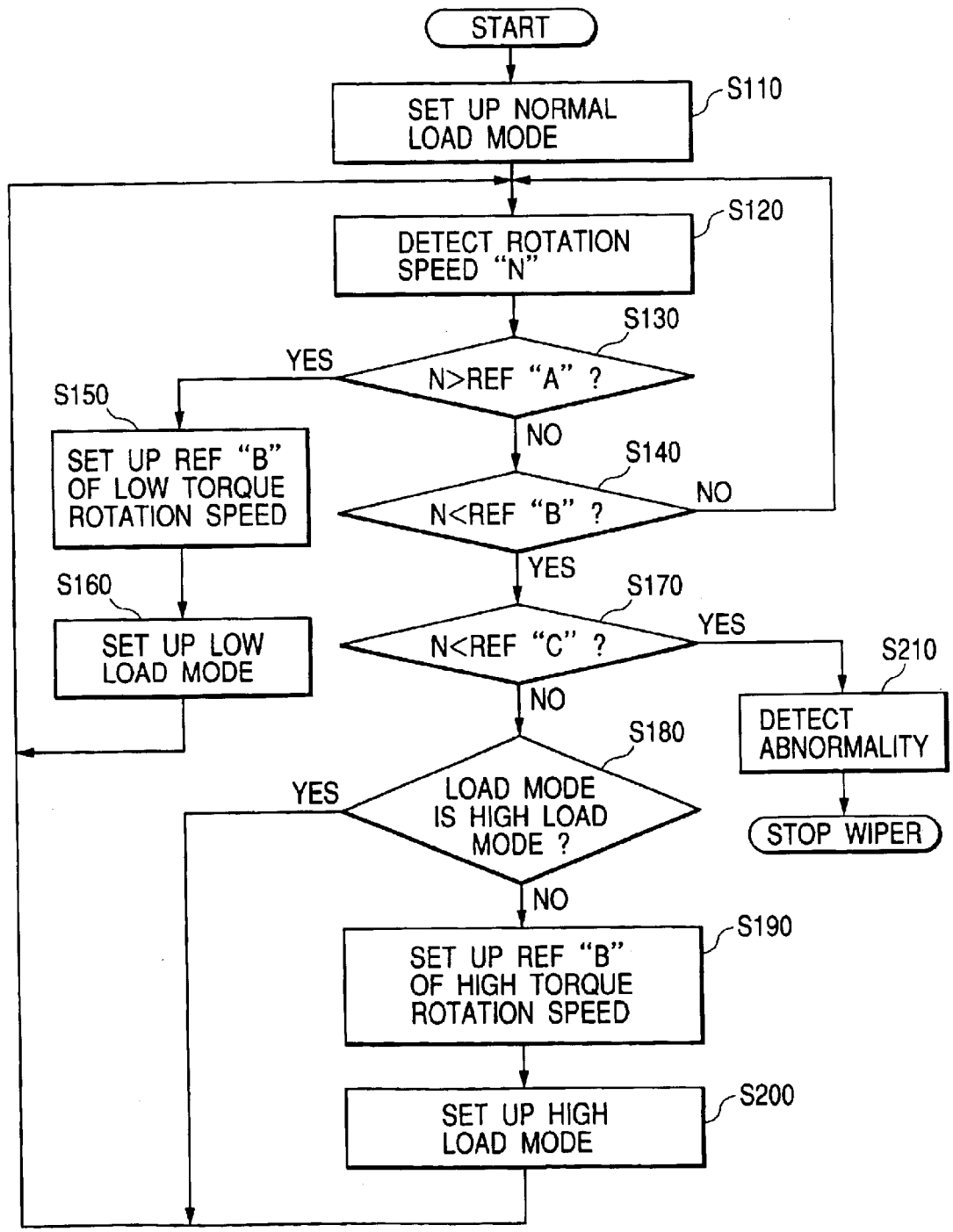
FIG. 4 is a flow chart of the LOW speed mode wiper driving process in Embodiment 1.

FIG. 4 is a flow chart of the LOW speed mode wiper driving process during switching on the ignition switch 18 and moreover setting up the LOW speed mode at the COMBI-SW 14*a*.

First, at S110, a load mode of the motor 12 is set up to a normal load mode.

The load mode is used to decide the duty of the PWM signal for controlling the turning on/off of the MOSFET 21 for supplying the motor 12 with an electric power. In accordance with the normal load mode, the communication micro-computer 24 switching on and off the MOSFET 21 by a PWM signal with a prescribed standard duty.

The rotation speed of the motor 12 is predetermined as wiping rotation speed every operation modes. The wiping rotation speed is defined by cycles per minute, where a cycle is a motion from the lower end position through the upper end position back to the lower end position. The wiping rotation speed is also expressed by how many times the not-shown rotation plate of the park position detection switch 13 as shown in FIG. 3 rotated.

As exemplified in FIG. 5A, the wiping rotation speed or simply rotation speed is 50 to 65 cycles/min. in the HIGH speed mode, while it is 20 to 35 cycles/min in the LOW speed mode.

Here, the high rotation speed is obtained by the 100% duty PWM signal which always switches on the MOSFET 21, while the low rotation speed is obtained by a prescribed duty PWM signal.

At S110, the PWM signal duty is set up to be a standard duty, thereby controlling the low rotation speed.

However, the rotation speed of the motor 12 may get out of the prescribed rotation speed, due to various factors, e.g., a state of the wiping surface and state of wiper blade. Accordingly, the rotation speed of the motor 12 is detected in order to compensate the duty, thereby holding the rotation speed within the prescribed range.

When the duty compensation is executed at S120 and its following steps, three references A (35 cycles/min.), B (25 cycles/min. at low torque; 20 cycles/min. at high torque) and C (10 cycles/min.) are referred to, for observing the rotation speed.

At S110, the wipers 1 and 2 start moving under the LOW speed mode due to the setting-up of the normal load mode, whereby the communication micro-computer 24 generates the stabdard duty PWM signal.

Next, at S120, the rotation speed "N" is detected on the basis of a time interval between the time period between a turn-on at the lower end position and next turn-on at the lower end position of the park position detection switch 13. Accordingly, the park position detection switch 13 works as rotation speed detection means.

Next, at S130, the detected speed "N" is compared with the reference "A" as shown in FIG. 5B, Usually, it is designed that "N" does not become greater than 35 cycles/min., as far as the PWM signal duty is set up to be standard. However, if "N" becomes greater than 35 cycles/min. due to some factor or other which causes a load reduction (increase in the rotation speed), S150 follows in order to set up the low torque rotation speed of 25 cycles/min. Then, at S160, the load mode is changed to the low load mode, thereby returning back again to S120.

In the above mentioned low load mode, the PWM signal duty is made a prescribed duty lower than the standard duty, thereby decreasing the rotation speed of the motor 12 and restoring back the rotation speed "N" within the prescribed range.

On the other hand, if "N" is determined to be smaller than the reference "A" at S130, S140 follows to compare "N" with the reference "B" (25 cycles/min.). If "N" is greater than the reference "B" (25 cycles/min.) at S140, S120 follows. Thus, S120 to S140 are repeated, if "N" is greater than 25 and smaller than 35. Here, the reference "B" of 25 is a default value. The default reference "B" is used, if the process steps proceed directly to S140, when "N" is smaller than 35.

Thus, the motor 12 is driven by the standard duty PUVM signal when the rotation speed "N" is greater than 25 and smaller than 35. However, when "N" is greater than 35, the PWM signal becomes of low duty and maintained to be of low duty (i.e., the motor 12 is driven under the low load mode), unless S200 as explained later is not executed.

Further, if "N" is determined at S140 to become smaller than the reference "B" of 25 due to some factor, e.g., an extreme dirt on the wiping surface or other, then S170 follows to further determine whether or not "N" is smaller than the reference "C". If "N" is smaller than the reference "C", it is determined that some factor or other caused an extremely low rotation of the motor 12 or its stoppage, thereby proceeding to S210 wherein an abnormal state is detected and then the motor 12 is completely stopped.

At the same time when the abnormal state is detected, the abnormality is notified to the driver by a lamp or buzzer, or a diagnosis code of the abnormality is stored in a memory.

On the other hand, if the rotation speed "N" is determined to be greater than the reference "C", it is determined that the wipers 1 and 2 are normally operated. Thus, S180 follows to determine whether or not the load mode is high load mode. However, at this time, the load mode is either the normal load mode or low load mode. Therefore, S190 follows to set up the reference "B" to be a high torque rotation speed of 20 cycles/min.

Next, at S200 following S190, the load mode is set up to be the high load mode wherein the PWM signal duty is set to be a prescribed duty higher than the standard duty in order to raise the rotation speed of the motor 12, thereby preventing the rotation speed "N" from lowering from the prescribed range of 20 to 35 cycles/min.

Then, afterward, as far as "N" is determined to be smaller than the reference B of 20, the load mode is the high load mode. Therefore, the determination result at S180 is affirmative (YES), thereby repeating S120 to S180.

Figure 10:
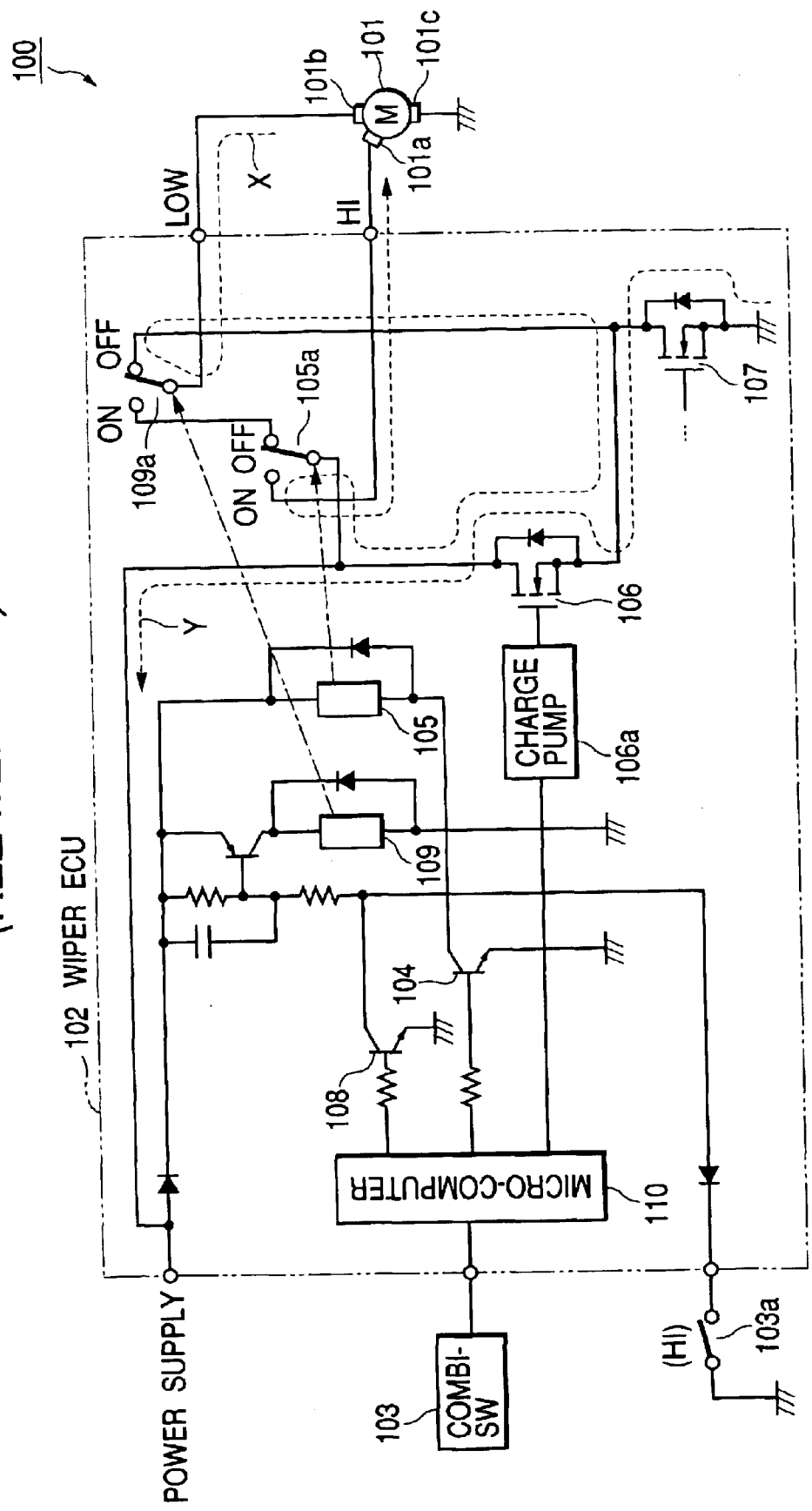
FIG. 10 is a block diagram of a conventional automobile wiper driving apparatus.

As explained above, the conventional three brush motor 101 as shown in FIG. 10 is not employed, but the two brush DC motor 12 as shown in FIG. 3 is driven by the PWM signal, thereby operating the wiper at the low & high speed and a speed in response to the rainfall.

Therefore, according to Embodiment 1, the motor 12 can be made small-sized by limiting the coil winding number to that of the conventional motor 101 required for the HIGH speed mode. Further, the wiper ECU can be simplified and small-sized, because the switching devices inclusively used for the LOW speed mode and HIGH speed mode are not required.

Therefore, the wiper driving module 10 including the motor 12 and wiper ECU 11 can be made small-sized and mounted on the automobile vehicle.

Further, the PWM signal duty can be selected among the standard, low and high duties in response to the detected rotation speed "N". The selected duty prevents the wiper speed from fluctuating due to the dirt of the front windshield and other factors, thereby stabilizing the wiper speed within a prescribed range.

Although the PWM signal duty was discretely threefold as explained above, it may be continuously changed in such a manner that the rotation speed "N" reaches a target speed in response to the continuously changed duty.

Further, there was provided in the above explanation the back-up relay Ry connected in parallel with the MOSFET 21 in order to operate the wipers 1 and 2 even when the malfunctions are caused in the communication microcomputer 24 and/or MOSFET 21. However, the wipers 1 and 2 may be operated at a speed lower than that of the HIGH speed mode by limiting the electric current through the motor 12 by utilizing a resistance provided between the contact of the back-up relay Ry and motor 12 (or ground).

Embodiment 2

Figure 6:
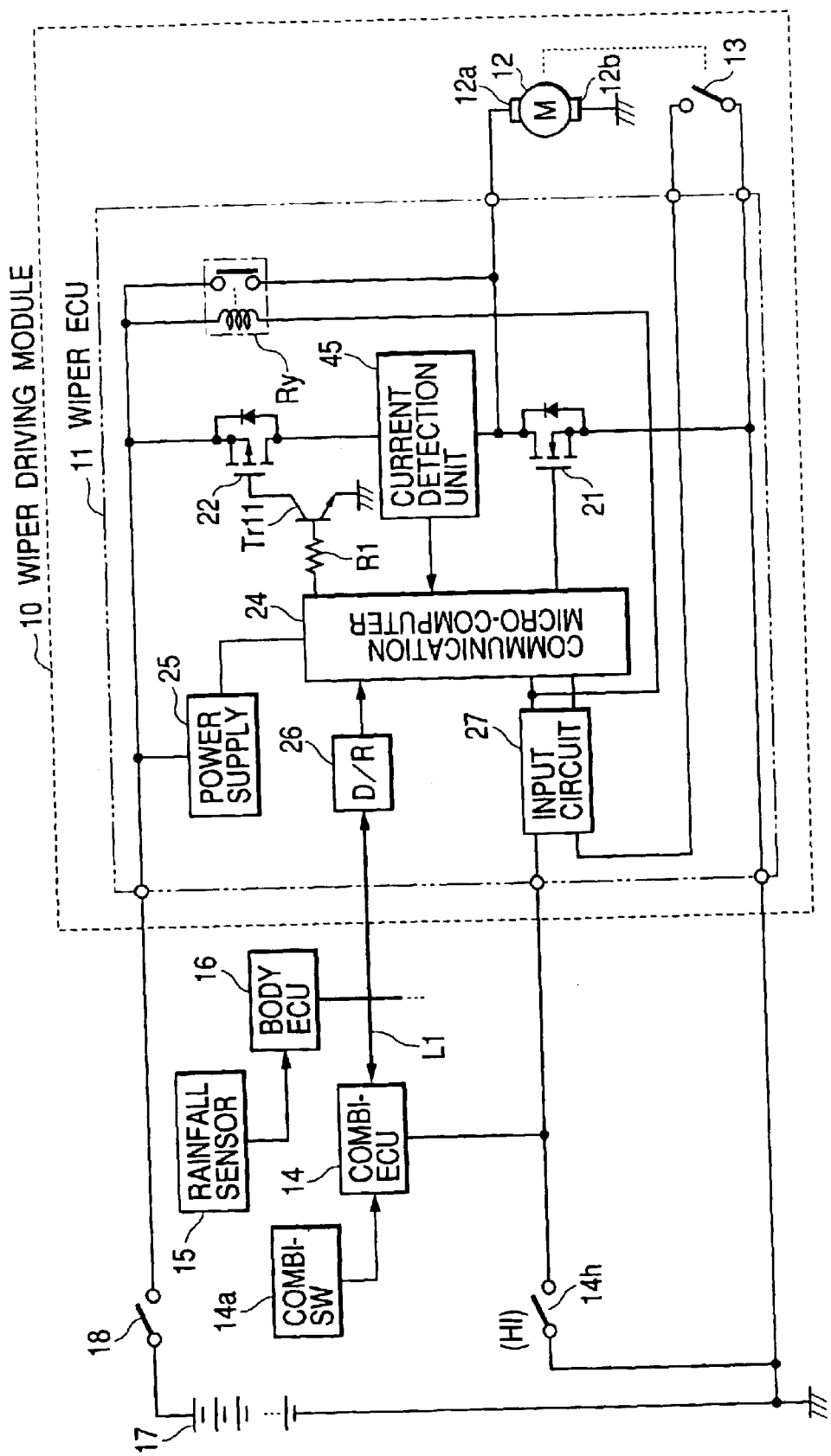
FIG. 6 is a circuit diagram of the wiper driving apparatus of Embodiment 2.

FIG. 6 is a circuit diagram of the wiper driving apparatus of Embodiment 2 which differs in that: the p-channel power MOSFET 22 (the braking device in Embodiment 1) is a switching device connected with the motor 12 (anode side of the battery 17); the n-channel power MOSFET 21 (the switching device in Embodiment 1) is a braking device; further, there is provided on the current route from the p-channel MOSFET 22 to the motor 12 a current detection unit 45 for detecting an electric current through the motor 12.

The differences between Embodiments 1 and 2 are mainly explained below, although similar points are not explained. Similar elements are designated by similar reference numerals.

In Embodiment 2 as shown in FIG. 6, the brush 12b of the motor 12 is connected with the ground, while the brush 12a is connected through the current detection unit 45 and p-channel MOSFET 22 with the anode of the battery 17.

The communication micro-computer 24 controls the p-channel MOSFET 22 by the PWM signal, while it rapidly stops the motor 12 by short-circuits the brush 12a with the brush 12b by switching on the n-channel MOSFET 21 which is connected in series with the motor 12.

Figure 7:
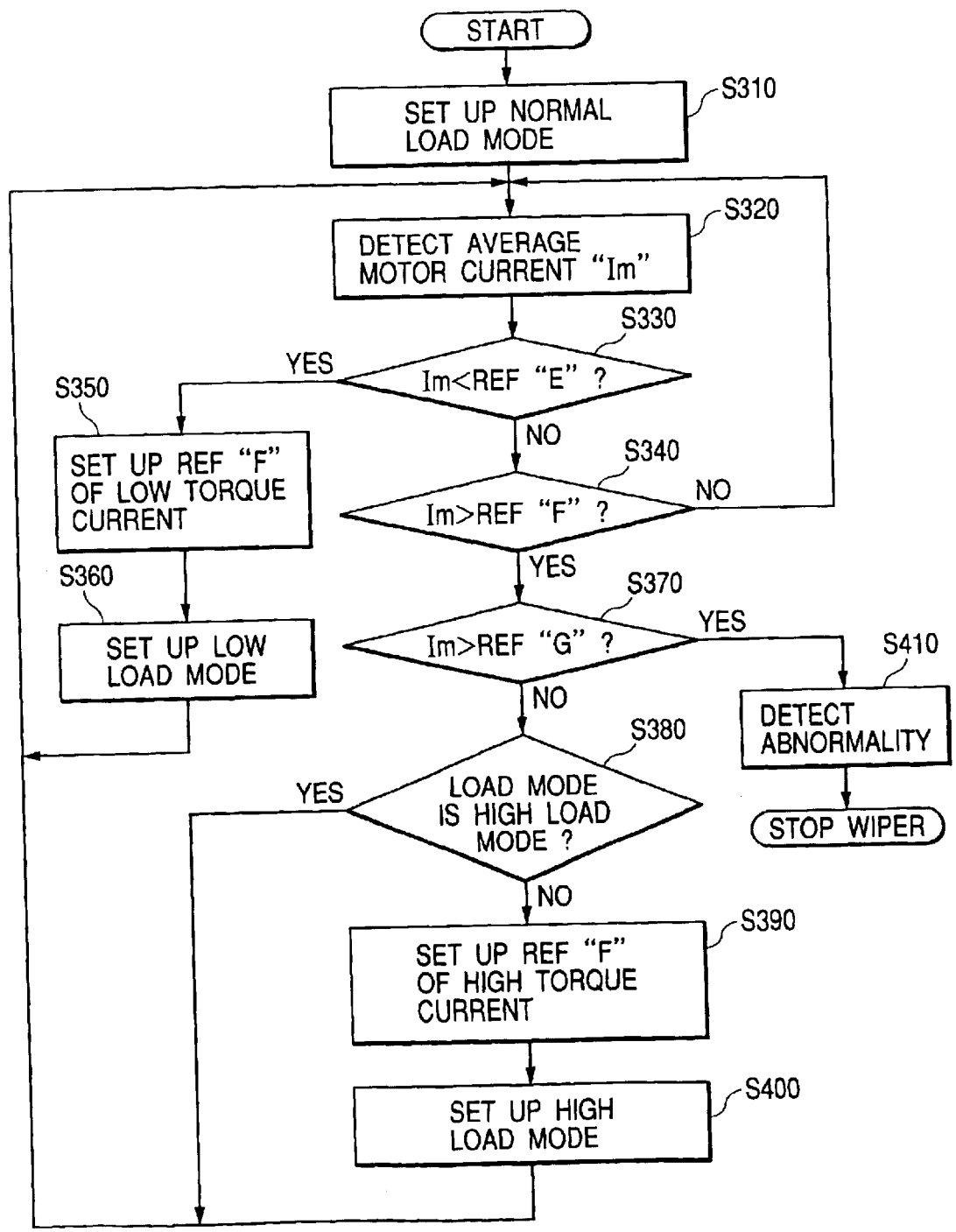
FIG. 7 is a flow chart of the LOW speed mode in Embodiment 2.

The communication micro-computer 24 executes HIGH speed mode, intermittent mode and automatic mode similarly to Embodiment 1, while it executes the LOW speed mode in accordance with a flow chart as shown in FIG. 7.

The LOW speed mode in Embodiment 2 is executed by utilizing the electric current of the motor 12 detected by the current detection unit 45, in place of the rotation speed "N" in Embodiment 1.

In general, when the external load applied to the motor 12 is increased, the rotation speed "N" is lowered and the electric current detected by the current detection unit 45 is increased. On the other hand, when the external load applied to the motor 12 is decreased, the rotation speed "N" is raised and the electric current detected by the current detection unit 45 is decreased. Accordingly, in Embodiment 2, the load on the motor 12 is determined by the motor current, thereby selecting, in accordance with the determined load, standard, low or high duty of the PCM signal for switching on and off the MOSFET 22.

First, at S310 (similarly to S110), the load mode of the motor 12 is set up to be the normal load mode, thereby driving the motor 12 under the standard duty PWM signal. Next, at S320, an average motor current Im is detected by the current detection unit 45.

S330 is a step for determining whether or not Im is smaller than a prescribed current "E", i.e., whether or not the current is increased due to some external factor or other. If Im is greater than or equal to "E", S340 follows.

At S340, it is further determined whether or not Im is greater than a prescribed current "F", i.e., whether or not the rotation speed is lowered due to some external factor or other. If Im is smaller than or equal to F, S320 follows.

On the other hand, if it is determined at S330 that Im is smaller than "E", the motor load is small. Accordingly, at S350, the prescribed current "F" is set up as the low torque motor current; and, at S360, the load mode is changed to the low load mode wherein the PWM signal duty is made to be lower than the standard duty, thereby returning back again to S320.

Here, the prescribed current "E", "F" and "G" correspond to the references "A", "B" and "C" in such a manner that: the rotation speed "N" becomes 35 cycles/min. by the motor current "E" under the standard duty PWM signal; "N" becomes 25 by a prescribed current "F" under the standard duty PWM signal under the normal and low load mode, while "N" becomes 20 by another prescribed current "F" under the standard duty PWM signal under the high load mode; and "N" becomes 10 by the motor current "G" under the standard duty PWM signal. Here, the prescribed current "G" is used for determining whether the motor 12 is rotated at an extremely low speed or stopped.

Further, if Im is determined to be greater than the prescribed current "F" at S340, the motor load is great. Therefore, it is further determined at S370 whether or not Im is greater than the prescribed current "G". If it is affirmatively determined at S340, the motor 12 is rotated at an extremely low speed of stopped. Accordingly, S410 follows in order to detect (similarly to S210) an abnormality, thereby completely stopping the motor 12.

On the other hand, it is determined at S370 to be smaller than or equal to the prescribed current "G", the motor current is normal. Therefore, S380 follows in order to determine whether or not the load mode set up at present is the high load mode. If the present load mode is not the high load mode, S390 follows in order to set up the prescribed current F as the high torque motor current. Further, at S400, the load mode is set up to be the high load mode, thereby returning back to S320. However, if the present load mode is determined to be the high load mode at S380, S320 immediately follows.

As explained above, the wiper driving apparatus of Embodiment 2 controls the motor 12, i.e., the wiping speed of the wipers 1 and 2 by controlling the p-channel power MOSFET 22 (a high side switching element for switching on and off the motor 12).

The motor 12 and wiper ECU 11 can be made small-sized, similarly to Embodiment 1 in such a manner that a module of the motor 12 and wiper ECU 11 can be mounted on automobile vehicles.

Further, the PWM signal duty is selected in response to the detected average motor current, thereby preventing the rotation speed under the LOW speed mode from fluctuating due to the external factors such as the dirty front windshield. Thus, the wipers 1 and 2 are stably moved within a prescribed speed.

Although in the above explanation of Embodiment 2 the p-channel power MOSFET 22 was used as the high side switch, an n-channel MOSFET may be used. However, if the n-channel MOSFET is employed, its driving voltage should be higher than the battery voltage. Thus, such a voltage step-up circuit as a charge pomp is required. Therefore, the wiper ECU 11 with the n-channel power MOSFET becomes larger than that with the above explained p-channel MOSFET.

Embodiment 3

Figure 8:
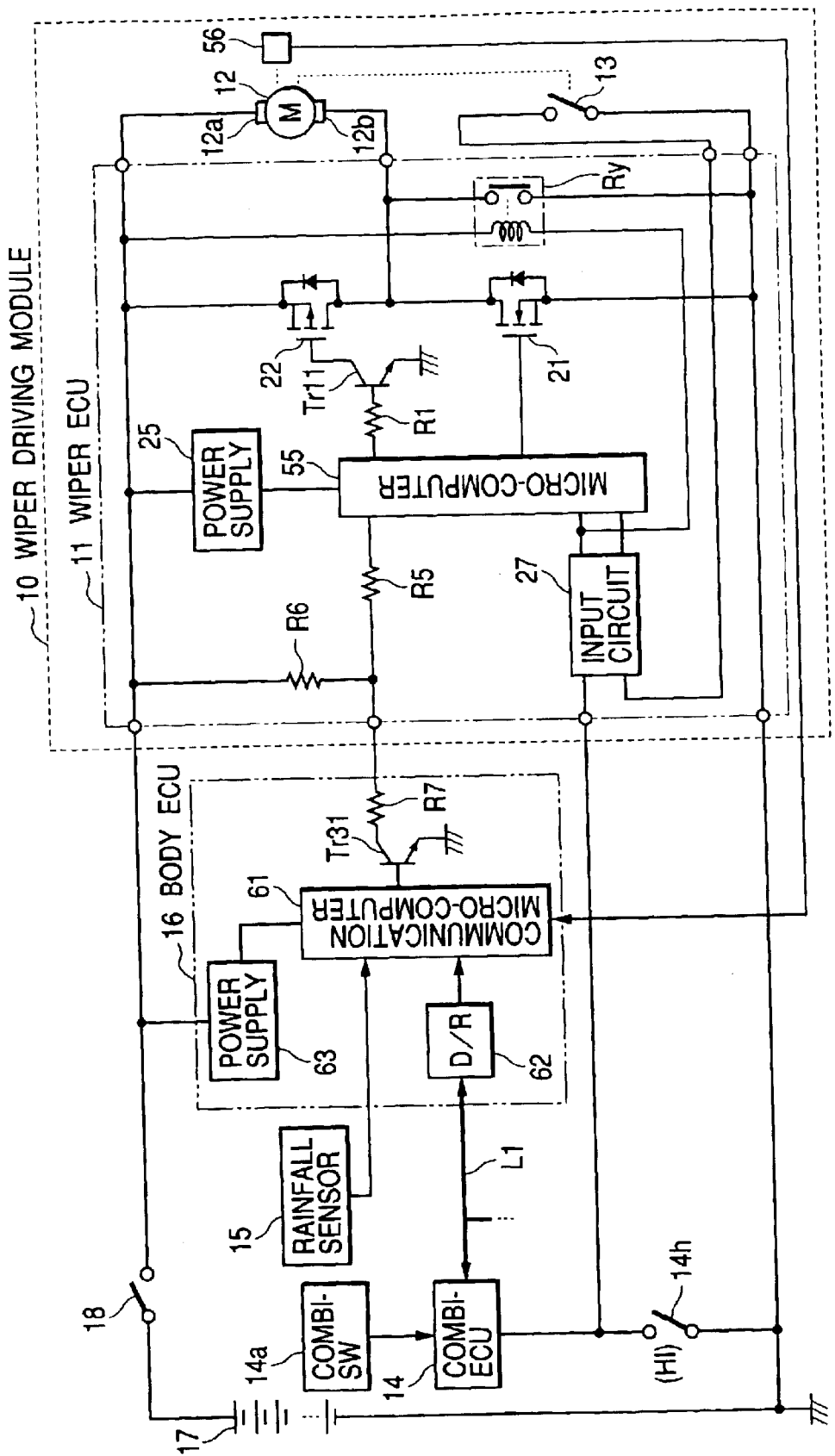
FIG. 8 is a circuit diagram of the wiper driving apparatus of Embodiment 3.

FIG. 8 is a circuit diagram of the wiper driving apparatus of Embodiment 3 which is different from those of Embodiments 1 and 2. The wiper driving apparatus of Embodiment 3 employs a communication micro-computer 61 (included in the body ECU 16) outside the wiper ECU 11. The communication micro-computer 61 determines the motor operation mode, decides the PWM signal duty for the motor 12, while a micro-computer 55 (without communication function) on side the wiper ECU 11 drives the motor 12 in accordance with the instruction outputted from the communication micro-computer 61.

Although the wiper ECU 11 of Embodiment 3 is constructed similarly to that of Embodiment 1, a low cost micro-computer 55 which can not execute data communication through the multiple communication line L1 is used in Embodiment 3, in place of the communication micro-computer 24 in Embodiments 1 and 2.

One of the input ports of the micro-computer 55 is connected with the power supply line through the pull-up resistance R6 and instruction signal input resistance R5. The instruction signal is inputted to the connection point of R5 and R6.

The body ECU 16 of Embodiment 3 is a combination of the body ECU 16 of Embodiment 1 and communication micro-computer 61 for computing the PWM signal duty on the basis of the operation mode as set up at the COMBI-SW 14a and of the rainfall detected by the rainfall sensor 15. The body ECU 16 of Embodiment 3 comprises: a communication micro-computer 61; a driver circuit D/R 62 for receiving a signal transmitted from the COMBI-ECU 14 through the multiple communication line L1, for converting the received signal into a signal form compatible to the communication micro-computer 61 and for outputting the converted signal to the communication micro-computer 61; a power supply circuit 63 for converting the battery voltage to a prescribed voltage (e.g., 5 V); and an output circuit for deciding a voltage at the connection point of R5 and R6.

Further, the above-mentioned output circuit comprises: an emitter-grounded npn transistor Tr 31; and a resistance R7 which is connected with the collector of Tr 31 and the connection of R5 and R6. The connection point of R5 and R6 is made low when the output of the communication micro-computer 61 (instruction signal) is high, while the connection is made high when the instruction signal is low. Thus, the instruction signal is transferred to the micro-computer 55.

The communication micro-computer 61 in the body ECU 16 outputs a signal of a frequency in response to the operation mode set up at the COMBI-SW 14a. For example, the frequency for the intermittent mode is a prescribed frequency lower than a reference frequency (e.g., 500 Hz) and the frequency for the normal operation mode (wherein the wipers 1 and 2 are continuously moved) is another prescribed frequency higher than the above mentioned reference frequency.

More concretely, the intermittent mode frequency is changed within a prescribed frequency range lower than the above mentioned reference frequency. The normal operation mode frequency depends upon the HIGH speed, LOW speed or automatic mode. The High speed mode frequency may be, e.g., 700 Hz, while the LOW speed mode frequency may be, e.g., 600 Hz. Further, the frequency for the LOW speed mode is changed within a prescribed range, e.g., 500 to 700 Hz, in response to the load on the wipers 1 and 2 or their target speed.

Thus, the micro-computer 55 in the wiper ECU 11: detects the frequency of the instruction signal from the communication micro-computer 61; and decides the duty of the PWM signal for driving the MOSFET 21.

Furthermore, the communication micro-computer 61 in the body ECU 16 measures during the LOW speed mode: a rise-up time during which the wipers 1 and 2 ascend from the lower end position to the upper end position (maximum wiping position); and a fall-down time during which the wipers 1 and 2 descend from the upper end position to the lower end position. The communication micro-computer 61 changes the PWM signal duty for the LOW speed mode when the wipers 1 and 2 in such a manner that a difference between the rise-up time and fall-down be within a prescribed tolerance.

In general, the load on the wipers 1 and 2 due to the wind pressure during driving of the automotive vehicle becomes greater during the wiper's ascending than during descending. Therefore, the motor 12 is controlled by changing the PWM signal duty during the wiper's descending under the LOW speed mode.

Figure 9:
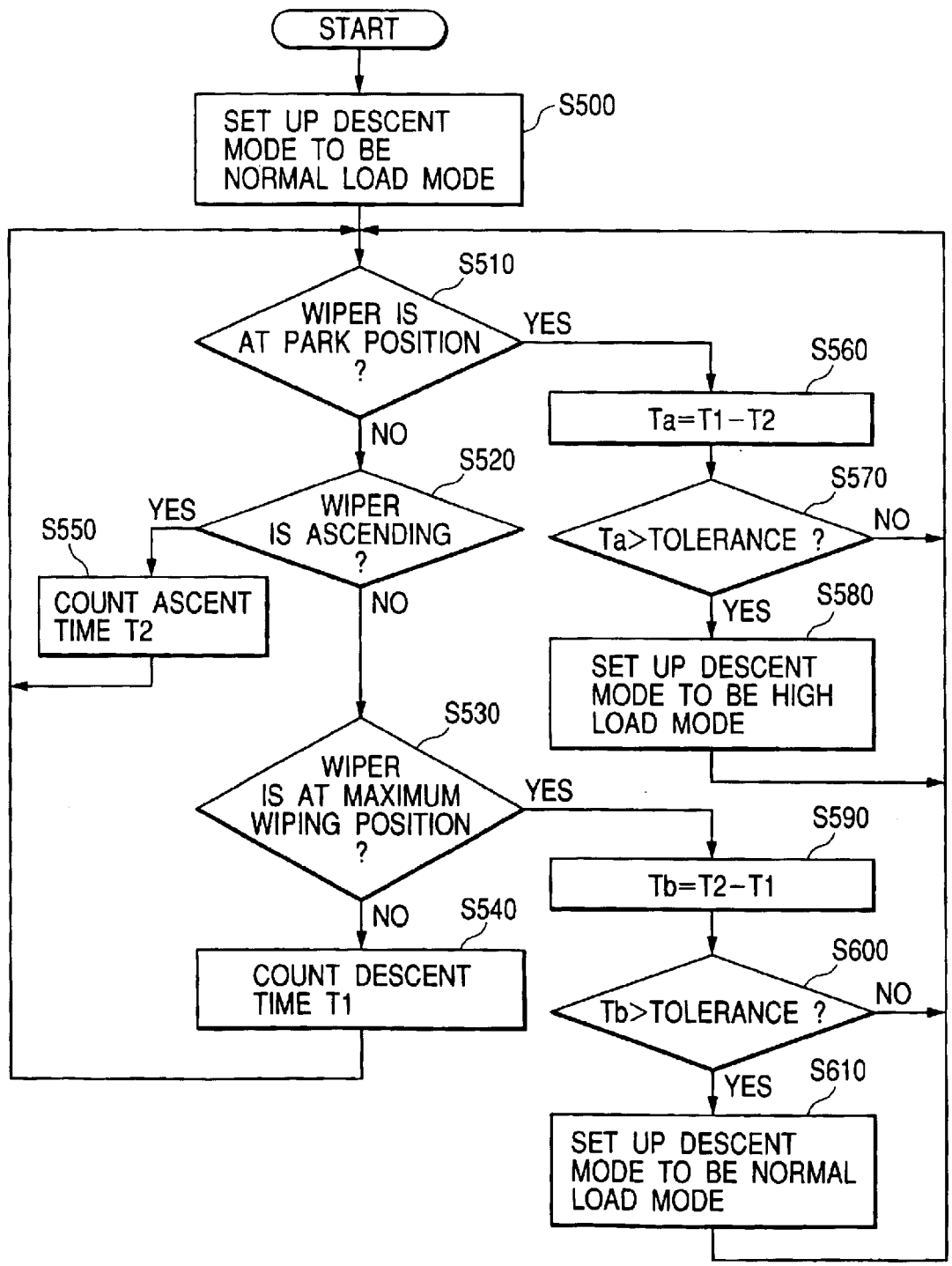
FIG. 9 is a flow chart of the LOW speed mode in Embodiment 3.

FIG. 9 is a flow chart for the communication micro-computer 61 to controlling LOW speed mode of Embodiment 3.

In order to execute the LOW speed mode control, there is provided in the deceleration mechanism 8 (cf. FIG. 2) a rotation sensor 56 as well as the park position detection switch 13. The rotation sensor 56 detects the lower and upper end positions park position and maximum wiping position, respectively) on the basis of the rotation of the motor 12. The detection signal from the rotation sensor 56 is inputted into the communication micro-computer 16.

The process steps as shown in FIG. 9 are controlled by the communication micro-computer 61 when the ignition switch 18 is turned on and moreover the LOW speed mode is set up at the COMBI-SW 14a.

The load mode (descent load mode) of the motor 12 when the wipers 1 and 2 descends is set up to be the normal load mode. Here, the descent load mode (different from the load mode in Embodiments 1 and 2) is used to decide the PWM signal duty during the descent of wipers 1 and 2.

First, at S500, the descent load mode is set up to be a normal load mode, whereby the duty during the wiper descent is set up to a standard duty which is the same duty during the wiper ascent and an instruction signal in response to the standard duty of which frequency is, e.g., 600 Hz is outputted from the communication micro-computer 61 and inputted into the wiper ECU 11.

As a result, the n-channel MOSFET 21 for driving the motor 12 is switched on and off by the standard duty PWM signal, regardless of the descent or ascent of the wipers 1 and 2.

Next, at s510, it is determined, on the basis of the detection signal from the rotation sensor 56, whether or not the wipers 1 and 2 are at the park position. If they are not at the park position (lower end position), S520 follows to further determine, on the basis of the detected signal from the rotation sensor 56, whether or not the wipers 1 and 2 are ascending. If they are ascending, the ascent time is counted up by a timer, thereby returning back again to S510.

Therefore, S510, S520 and S550 are repeated as far as the wipers are ascending, thereby measuring the ascent time period.

On the other hand, if it is determined at S520 that the wipers 1 and 2 are not ascending, S530 follows to determine, on the basis of the detected signal from the rotation sensor 56, whether or not the wipers 1 and 2 are at the maximum wiping position as shown in FIG. 1. If it is determined that they are not at the maximum wiping position, they are obviously descending. Therefore, the descent time is counted up by a timer, thereby returning back again to S510.

Therefore, S510, S520, 530, S540 and S550 are repeated as far as the wipers are descending, thereby measuring the ascent time period T2.

If it is determined at S510 that the wipers 1 and 2 are at the park position, S560 follows to read out the ascent time period T2 and descent time period Ti and calculate Ta (=T1−T2), thereby proceeding to S570 to determine whether or not Ta is greater than a prescribed time interval tolerance (positive value).

If it is determined at S570 that Ta is not greater than the prescribed time interval, thereby returning back to S510. However, if it is determined at S570 that Ta is greater than the prescribed time interval, S580 follows to set up the high load mode for the descent load mode, thereby returning back to S510.

When the descent load mode is set up to be the high load mode at S580, the communication micro-computer 61 sets up, during the wiper descent, the PWM signal duty to be higher than the standard duty, thereby outputting toward the wiper ECU 11 an instruction signal of which frequency is, e.g., 650 Hz in response to the higher duty.

Thus, the MOSFET 21 is switched on and off by the standard duty PWM signal responsive to the 600 Hz instruction signal during the wiper ascent and by the higher duty PWM signal responsive to the 650 Hz instruction signal.

Further, if it is determined at S530 that the wipers 1 and 2 are at the maximum wiping position, S590 follows to read out the ascent time period and descent time period and calculate Tb (=T2−T1), thereby proceeding to S600 to determine whether or not Tb is greater than a prescribed time interval (positive value).

If it is determined at S600 that Tb is not greater than the prescribed time interval, S510 follows. However, if it is determined at S600 that Tb is greater than the prescribed time interval, S610 follows to set up the descent load mode to be the normal load mode, thereby returning back to S510.

Thus, when the descent load mode is set up to be the normal load mode at S610, the MOSFET 21 is switched on and off, regardless of the wiper descent or wiper ascent, by the standard duty PWM signal responsive to the 600 Hz instruction signal.

As explained above, in the wiper driving apparatus of Embodiment 3, the body ECU 16 (separated from the motor 12) decides The PWM signal duty for controlling the motor 12, while the wiper ECU 11 (combined with the motor 12) drives the motor 12 by generating the PWM signal of which duty is decided by the body ECU 16.

Accordingly, the communication function is not required for a the micro-computer employed by the wiper ECU. Therefore, the wiper driving module 10 including the wiper ECU 11 and motor 12 can be manufactured at a cost lower than Embodiments 1 and 2.

Further, the body ECU 16 do not become costly, even when it executes the duty decision control. This is because it is a usual and conventional ECU for controlling the body related devises as well as the wipers.

Accordingly, the wiper driving module 10 employing the wiper ECU 11 can be made small-sized and can be manufactured at a lower cost.

Further, Embodiment 3 prevents the driver from feeling a sense of physical and/or mental disorder, because the difference between the rising-up time and falling-down time periods of wipers 1 and 2 is made small.

In the above explanation of Embodiment 3 the wiper descent time period was changed on the basis of the general principle that the wiper descent time becomes longer than its asent time due to the wind pressure. However, the ascent time may possibly become longer than the descent time, if there is caused any other factors than the wind pressure. Accordingly, the wiper ascent time may be changed by the duty of the PWM signal.

Further, in Embodiment 3, the PWM signal duty during the wiper's descending was made higher than the standard duty, when Ta (the descent time subtracted by the ascent time is greater than a prescribed time. However, the wind pressure becomes increased, as the automobile travels faster. Accordingly, the PWM signal duty may be made greater in response to the faster speed of the automobile.

What is claimed is:

1. An automobile wiper driving apparatus comprising:
   a DC motor driven by a DC power supply for repeatedly moving a wiper between a prescribed park position and a maximum wiping position; and
   wiper controlling means for receiving a signal indicating an inputted operation speed of said wiper and controlling said wiper to move at the inputted operation speed by driving said DC motor at a rotation speed which corresponds to the inputted operation speed,
   wherein said wiper and wiper controlling means are assembled in a module, and said wiper controlling means comprises;
   a switching element, provided on a current route between said DC power supply and said DC motor, receiving a pulse width modulation signal having a duty which corresponds to the inputted operation speed, performing a switching on and off operation responsive to the pulse width modulation signal so as to drive said DC motor at the rotation speed, and controlling said wiper to move at the inputted operation speed; and
   a relay, connected in parallel with said switching element, for switching on to move said wiper at a predetermined operation speed regardless of states of said switching element, when the inputted operation speed is equal to the predetermined operation speed.

2. The automobile wiper driving apparatus according to claim 1 wherein said switching element is a power MOSFET which is provided on a current route between said DC motor and a cathode of said DC power supply.

3. The automobile wiper driving apparatus according to claim 1, which further comprises a rotation speed detection means for detecting a rotation speed of said DC motor, wherein said wiper controlling means compensates said duty whereby said rotation speed corresponds to said inputted operation speed.

4. The automobile wiper driving apparatus according to claim 1, which further comprises a current detection means for detecting a motor current through said motor, wherein said wiper driving means compensates said duty whereby said motor current corresponds to said inputted operation speed.

5. The automobile wiper driving apparatus according to claim 1, wherein said wiper controlling means set up said pulse width modulation signal in such a manner that a duty dining said wiper's moving from said maximum wiping position to said park position is greater than a duty during said wiper's moving from said park position to said maximum wiping position.

6. The automobile wiper driving apparatus according to claim 1, wherein said wiper controlling means further comprises:
   a timer for counting a wiper descent time period T1; and
   another timer for counting a wiper ascent time period T2,
   wherein said wiper controlling means set up said duty of said pulse width modulation signal in such a manner that a difference between T1 and T2 is within prescribed period.

7. The automobile wiper driving apparatus according to claim 1, wherein the predetermined operation speed indicates movement of said wiper at a high speed mode, and said wiper is moved by said DC motor at a high speed while a driving current passes through said DC power supply, said DC motor and said relay switched on, when the inputted operation speed is equal to the predetermined operation speed.

8. The automobile wiper driving apparatus according to claim 1, wherein said wiper controlling means monitors a rainfall detection signal and controls the DC motor responsive to the rainfall detection signal.

9. The automobile wiper driving apparatus according to claim 1, wherein said DC motor is a two brush DC motor.

10. The automobile wiper driving apparatus according to claim 1, wherein said wiper controlling means further comprises a microcomputer, the microcomputer being configured to facilitate measuring a time difference between a descent of the wiper and an ascent of the wiper, and changing the duty during the ascent or and descent so that the difference is within a prescribed tolerance.

* * * * *